Figure 7:
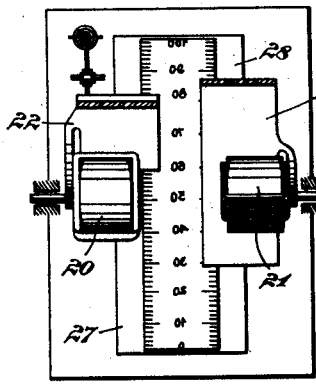

Dec. 17, 1929.  R. VON VOSS ET AL  1,740,130
MEASURING INSTRUMENT
Filed Oct. 24, 1928   2 Sheets-Sheet 1
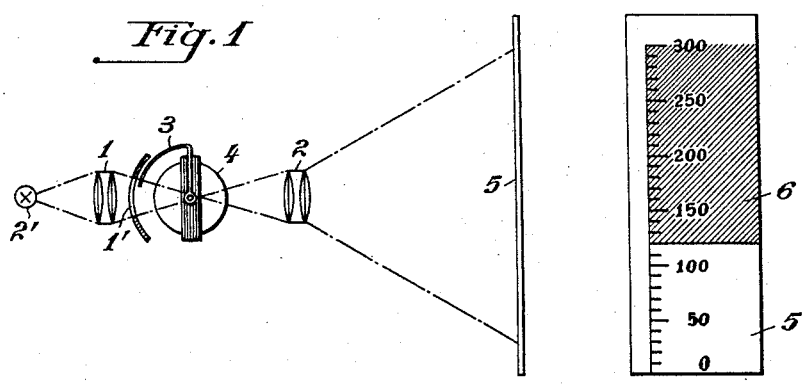
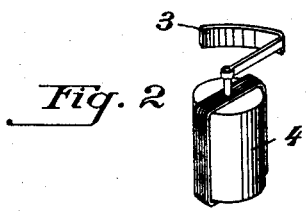
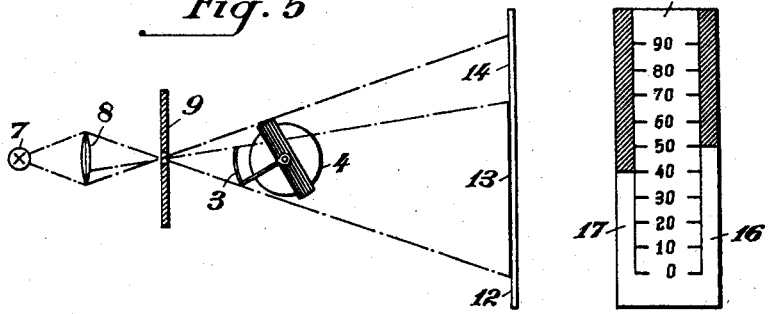
INVENTORS
RICHARD VON VOSS.
MANFRED SCHLEICHER
BY
ATTORNEYS.

Dec. 17, 1929.  R. VON VOSS ET AL  1,740,130
MEASURING INSTRUMENT
Filed Oct. 24, 1928  2 Sheets-Sheet 2

INVENTORS
RICHARD VON VOSS
MANFRED SCHLEICHER
BY
ATTORNEYS

Patented Dec. 17, 1929

1,740,130

UNITED STATES PATENT OFFICE

RICHARD von VOSS, OF BERLIN-WESTEND, AND MANFRED SCHLEICHER, OF BERLIN-CHARLOTTENBURG, GERMANY, ASSIGNORS TO SIEMENS & HALSKE, AKTIENGE-SELLSCHAFT, OF SIEMENSSTADT, NEAR BERLIN, GERMANY, A CORPORATION OF GERMANY

MEASURING INSTRUMENT

Application filed October 24, 1928, Serial No. 314,609, and in Germany October 5, 1927.

Our invention relates to improvements in measuring instruments, and more particularly to measuring instruments or apparatus in which light is employed as indicating means.

It is already known to make the position of pointers visible by the aid of sources of light. An incandescent lamp with a single straight filament has, for instance, been placed along a pointer and a shadow of the pointer been thrown on to a frosted pane. For remote readings covering strips or movable sources of light have been generally employed, these parts being moved by a motor or the like controlled in dependence of the positions of the pointer. This construction is, however, inconvenient and complicated.

In other known apparatus the indication is effected by means of a beam or spot of light projected on to a screen by a mirror mounted on or connected with the axis of rotation of the measuring system. This arrangement, however, can not be employed in all cases because the mirror becomes covered with a film of moisture, and the indications are not clear and distinct enough to be read from a distance, particularly in twilight.

Arrangements in which lamps or series of lamps are used as optic indicators have many disadvantages and are so complicated that they are liable to get out of order frequently.

According to our invention these disadvantages are avoided by a beam of light covering the entire scale being partly screened or cut off by a vane or blade connected with the axis of rotation of the measuring instrument. By the provision of a screening vane on the axis of the system it is possible to effect the indication of the deflection upon the scale by means of the border line between the lighted parts and those in the shadow in the manner most suitable for the purpose and to dispense with complicated optical auxiliaries, such as multiple lens systems, mirrors and the like. Our improved apparatus is distinguished by great simplicity and reliability and is also very suitable for remote readings.

If the screening vane is, for instance, used to produce on a lighted scale a band or stripe of shadow, so that the sharp and distinct border line between the lighted surface and that in the dark indicates the deflection of the measuring instrument so as to be visible from a great distance, a particularly high degree of accurate readings from long distances is obtained by simple means.

A further improvement attainable by the use of the screening vane consists in locating parallel to an illuminated slot or gap or to a linear source of light a scale preferably lighted by the same source of light in such a manner, that besides the band of light the scale is also projected on to a frosted pane.

Figure 6:
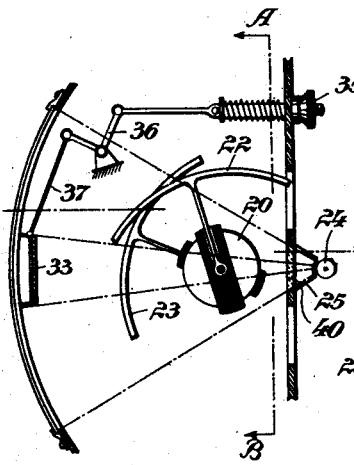
Figure 8:
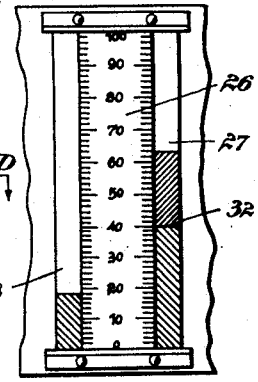
Figure 9:
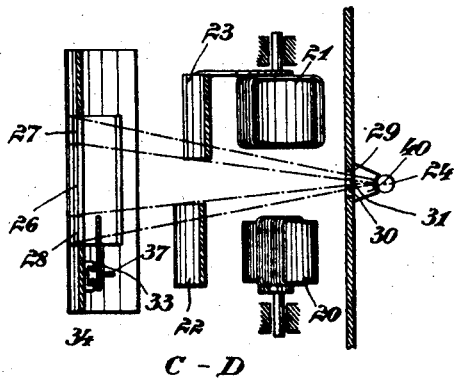

Various embodiments of our invention are diagrammatically illustrated in the drawings affixed hereto and forming part of our specification. The drawings show:

Fig. 1, an apparatus in which the border line between the lighted part of the scale and that in the dark is made use of for remote indications;

Fig. 2, a screening vane mounted on the moving system of a measuring instrument;

Fig. 3, a front elevation of the scale shown in side-elevation in Fig. 1;

Fig. 4, the design of the scale if the deflections of two measuring instruments are to be made visible on a single scale;

Fig. 5, a system in which the shadow image of the scale screen designed as opaque or color screen serves as indicator;

Fig. 6, a system in which a scale is projected on to a frosted pane and shadow stripes are produced at both sides of the scale by two measuring systems and which cover up light of different colors;

Fig. 7, a cross section on the line A—B of Fig. 6;

Fig. 8, a detail view of the scale showing the two shadows cast thereon;

Fig. 9, a cross section on the line C—D of Fig. 6.

Referring to Fig. 1 of the drawings, it will be seen that the usual lens system 1 is located between the source of light 2 and a stationary cylindrical segment or diaphragm. On the spindle of the rotating system 4 of a measuring instrument is mounted the bent screening vane 3. It moves in front of the confining slot 1' of the stationary segment.

Between the vane and the scale 5 there is located the projector system 2 preferably constructed of cylindrical lenses. According to the degree of the deflection of the rotating system 4 and thus to the position of the vane 3 a portion of the slot or gap 1' and on the lighted scale 5 a corresponding part of the area is covered up or screened, as shown in Fig. 3 of the drawings.

The edge of the vane moving in front of the gap or slot 1' appears on the scale as clear and distinct border line between the lighted portion 5 and the projected shadow 6 and serves as pointer for the deflections of the measuring instrument. It will be understood that the vane and the stationary diaphragm may be flat plates, the former then being reciprocated linearly in any suitable manner.

In Fig. 4 of the drawings a scale is illustrated on which the deflections of two measuring instruments are made visible.

The scale proper 15 is preferably located in the center and the indications are effected on the right 16 and on the left 17 of it by shadows or colored stripes, by means of two mechanisms preferably of the kind illustrated in Fig. 1 of the drawings. The scale itself may in known manner be lighted from the front or the back.

Fig. 5 of the drawings shows a simplified construction of our improved apparatus, in which the light emanating from the source of light 7 is refracted by means of a bi-convex lens 8, for instance, in such a manner, that the image of the source of light appears in a slot 9.

It will be understood that it is equally well possible to use a linear source of light and a round hole in the diaphragm. By the vane or blade 3 mounted on the rotating spindle of the measuring system 4 the light issuing from the gap or slot in the diaphragm 9 is partly screened, so that on a surface 12 preferably provided with a scale as indicator for the deflection of the measuring instrument a corresponding shadow projection of the vane 3 becomes visible.

In Fig. 5 the shifting shadow is at 13 and above it is the lighted part 14. The projecting surface itself may naturally also be curved, if desired, and a suitable system of lenses may be used for this purpose.

If it is desired to indicate on the same surface the deflections of a plurality of measuring systems, differently colored screens may be placed into the path of the rays of light, so that the various bands of light located side by side may be destinguished by their colors.

In the Figures 6, 7, 8 and 9 are shown several projections of an apparatus with two movable systems 20 and 21, which are independent of each other. Each of the movable systems carries a screen 22 and 23. The screens are moved by the movable system 20 and 21 into the path of the rays of a uni-dimensional source of light 24, which may be a luminous spot or a straight filament. The light emanating from the source of light 24 is by a diaphragm opening 25 confined in such a way that it lights the scale 26 and the two strips 27 and 28 on either side of it. The carrier of the scale 26 as well as the strips 27 and 28 is a curved frosted pane.

In Fig. 9 of the drawings is illustrated an apparatus in which the screen contains two transparent colored diaphragms 29 and 30. The transparent diaphragm 30 is of blue color, for instance. The result is that the band or strip 28 in Fig. 8 appears blue, as far as it is not thrown into the shadow by the screen 23 of the system 21. The diaphragm 29 is, for instance, of red color, so that the strip 27 below a border line 32 may appear in red color. The central diaphragm 31 carries the reduced image of the scale 26, which becomes visible on the frosted pane by projection. Light from outside is kept away by a screen 40. The measuring system 20, which may be an ammeter, possesses on its indicator surface a device, which shows if the current exceeds a permissible limit. The device consists of a color screen 33, for instance, a blue one, located in the interior of the measuring instrument in front of the indicating strip upon which the measuring system 20 makes its deflections visible by the shadow of its screen 22. When in this figure, as assumed, the screen 22 has been so far deflected, that the indicating strip 27 is visible adjacent to the scale up to the division line 60, the red color appears from 0 to 40 and above 40 the mixture of red and blue i. e. violet. The part above the line 60 is in darkness with the illustrated setting of the measuring instrument 22. In order that the color screen 33 may be set according to the purpose it is used for or the requirements of the service, it is mounted on a slide 34. In the construction illustrated the instrument is then provided with an adjusting screen 35, which by means of a bell-crank lever 36 and a connecting rod 37 enables the color screen to be adjusted as required.

The width of the screens 22 and 23 is, furthermore so chosen, that in the central position of the movable system the screens just throw into the shadow the entire scale or the adjacent indicating strips in their entire length. According to whether one of the measuring instruments deflects from the central position towards one direction or the other the lighted portion of an indicating strip commences at the lower or upper end of the scale. In this way the direction of the deflection may be recognized besides the magnitude of the deflection.

Various modifications and changes may be made without departing from the spirit and the scope of the invention, and we desire,

We claim as our invention:—

1. In a measuring arrangement, a source of light, a scale, a rotating system, and an opaque screen coupled with said rotating system and adapted to be placed between said source of light and said scale, said screen being of sufficient length to cast a shadow stripe on the entire length of said scale.

2. In a measuring arrangement, a source of light, a scale, a rotating system, and an opaque screen coupled with said rotating system and adapted to be placed between said source of light and said scale, said screen being of sufficient length to cast a shadow stripe on said scale of a length equal to the length of said scale.

3. In a measuring arrangement, a source of light, a scale, a rotating system, and an opaque screen coupled with said rotating system and adapted to be placed between said source of light and said scale, said screen being of sufficient length to cast a shadow stripe on said scale equal in length to the length of said scale, said screen in its normal position casting its shadow on the whole length of said scale whereby movement of said screen in either direction causes movement of said shadow to permit some of the light to fall on one end or the other of said scale.

4. In a measuring arrangement, a source of light, a pair of scales placed side by side, a pair of rotating systems and screens coupled to each of said rotating systems and adapted to be placed between said source of light and said scales and on either side of the direct line from said source of light to said scales, whereby each of said screens casts a shadow on one of said scales.

5. In a measuring arrangement, a source of light, a pair of scales placed side by side, a pair of rotating systems and screens coupled to each of said rotating systems and adapted to be placed between said source of light and said scales and on either side of the direct line from said source of light to said scales, whereby each of said screens casts a shadow on one of said scales, each of said screens being of sufficient length to cast shadow stripes on said scales of a length equal to the length of said scales.

6. In a measuring arrangement, a source of light, a projecting surface, a rotating system, and an opaque screen coupled with said rotating system and adapted to be placed between said source of light and said projecting surface, and a transparent base between said source of light and said projecting surface having opaque calibrations thereon, whereby said calibrations are projected on said projecting surface to form a scale and said screen casts a shadow stripe on said scale.

7. In a measuring arrangement, a source of light, a projecting surface, a rotating system, and an opaque screen coupled with said rotating system and adapted to be placed between said source of light and said projecting surface, and a transparent base between said source of light and said projecting surface having opaque calibrations thereon, whereby said calibrations are projected on said projecting surface to form a scale and said screen casts a shadow stripe on said scale, said base being removable so that it may be replaced by a second base having a different calibration.

8. In a measuring arrangement, a source of light, a projecting surface, a rotating system, and an opaque screen coupled with said rotating system and adapted to be placed between said source of light and said projecting surface, and a transparent base between said source of light and said projecting surface having opaque calibrations thereon, whereby said calibrations are projected on said projecting surface to form a scale and said screen casts a shadow stripe on said scale, said screen being of sufficient length to cast a shadow on said scale of a length equal to the length of said scale.

9. In a measuring arrangement, a source of light, a projecting surface, a pair of rotating systems, screens coupled with each of said rotating systems and adapted to be placed between said source of light and said projecting surface, a transparent base between said source of light and said projecting surface having two sets of opaque calibrations thereon side by side, said screens being positioned on either side of the line from said source of light to said projecting surface, whereby a scale is formed on said projecting surface and said screens form shadow stripes on said scale.

In testimony whereof we affix our signatures.

RICHARD von VOSS.
MANFRED SCHLEICHER.